INVENTOR
FRANZ W. R. STARP

BY Arthur A. March
ATTORNEY

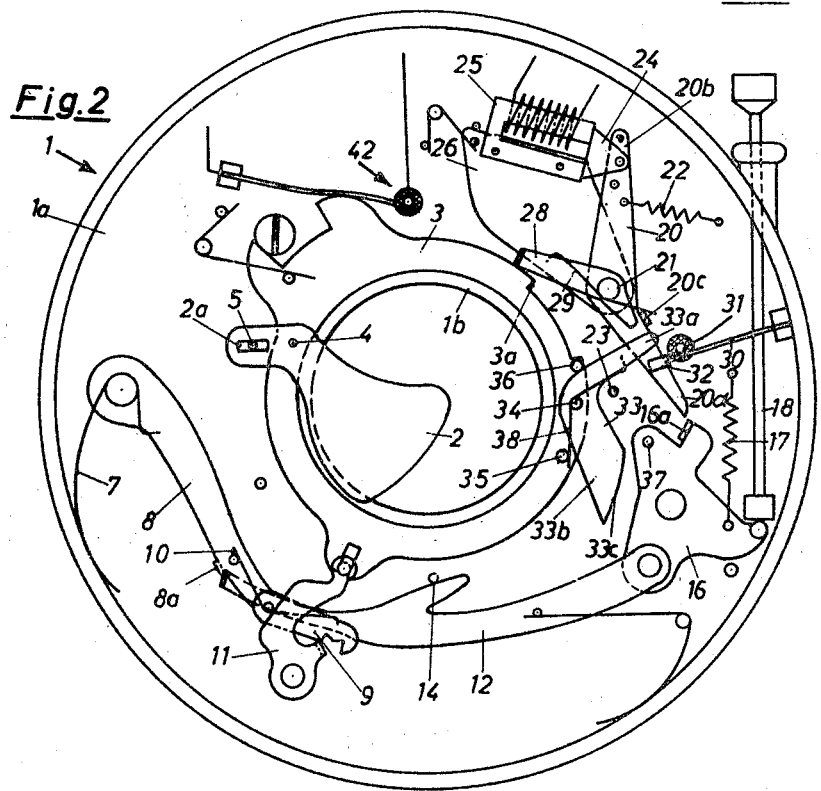
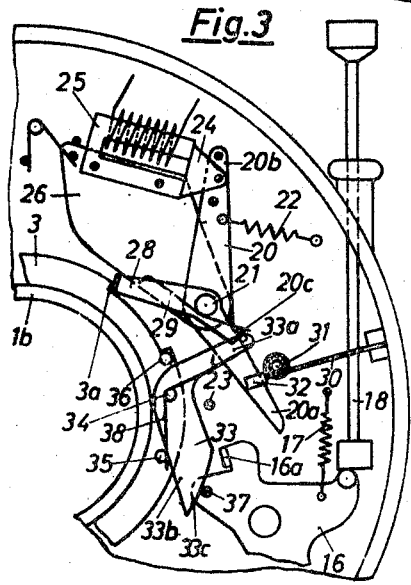
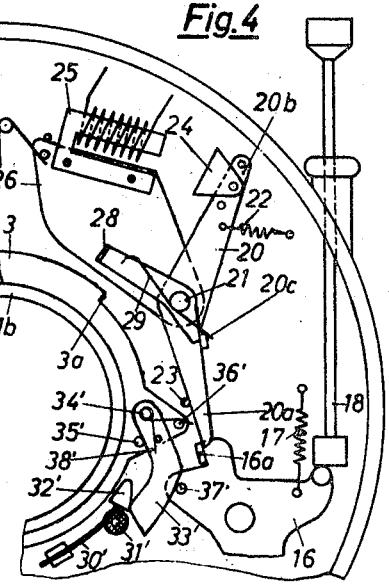
INVENTOR
FRANZ W. R. STARP
BY Arthur A. March
ATTORNEY 3,425,329
PHOTOGRAPHIC SELF-COCKING SHUTTER WITH
ELECTRONIC SHUTTER SPEED CONTROL
Franz W. R. Starp, Calmbach, Black Forest, Germany,
assignor to Prontor-Werk Alfred Gauthier, G.m.b.H.,
Calmbach, Black Forest, Germany, a corporation of
Germany
Filed July 11, 1966, Ser. No. 568,717
Claims priority, application Germany, July 9, 1965,
P 37,222
U.S. Cl. 95—53       11 Claims
Int. Cl. G03b 9/60

This invention relates to photographic self-cocking shutters and in particular to the type having a shutter blade movable back and forth by means of a driving member which can be blocked in the open position of the blade by an electronically-controlled magnet to make exposures of controllable duration. The shutter includes a switch to supply operating power to the electronic timing device when the shutter release mechanism is actuated.

Self-cocking shutters have been designed heretofore with an armature fastened to one end of a two-armed lever and brought into contact with an electromagnet during the winding and release process. In such prior shutters, a contact switch was actuated by the other end of the lever to connect a supply voltage to the electronic circuit immediately prior to the release of the shutter. When the mechanical shutter-driving device was released at the end of this series of operative steps, the electronic timing circuit went into operation when the shutter blades moved to the open position, thus causing the armature to be held by the electromagnet until the time determined by the timing circuit. Thereafter the armature was released when the transistors in the timing circuit were actuated.

It was possible, by improper handling, and in particular by incomplete operation of the shutter release mechanism by the photographer, to cause the switch to close and the armature to make contact with the electro-magnet without having the shutter-driving device put into motion. This could happen especially if the shutter trigger were released prematurely. As a result, operating voltage would be supplied to the electromagnet but the electronic timing circuit would not be put into operation, and therefore the holding current in the electro-magnet would never be interrupted. This improper cycle of operation in which the electromagnet would continue to attract the armature as long as the contact switch remained closed, while the latter, in turn, would remain closed as long as the electromagnet continued to be energized could continue until the battery ran down.

It is one of the objects of the present invention to avoid this improper operation in self-cocking shutters and particularly to provide a simple structure which will assure that, even if the shutter trigger is not properly depressed, the switch that supplies current to the timing circuit and the electromagnet will be automatically opened again.

In accordance with the present invention, a spring-loaded positioning lever is provided to cooperate with the switch and to change its position automatically with the driving member that actuates the shutter blades. The lever cooperates with the movable member of the switch and with a part of the release mechanism in such a way that the latter displaces the movable switch automatically from the position in which it makes contact with the fixed member of the switch when the release mechanism returns to its starting position after it has been actuated, unless the operation of the shutter drive has begun. Thus, even if the shutter trigger is incompletely operated, it is impossible for the armature to stick to the electromagnet and remain there until the battery runs down.

In one form of the invention which has certain advantages both from a design and from a functional point of view, the positioning lever can be designed to have two arms, one of which acts upon a member that transmits the releasing force to the shutter-drive device and the other of which acts upon a member that transmits the releasing force to the shutter-drive device and the other of which acts upon the movable contact of the switch. It is also possible to construct the positioning lever as a single-armed pawl, which is advantageous in that it reduces the mass of the moving structures. This pawl can be arranged to cooperate directly with the part of the shutter that transmits the release force and with the movable arm of the switch.

The invention will be described in greater detail in the following specification, together with the drawings in which:

FIG. 2 shows the shutter of FIG. 1 in that part of its cycle of operation in which the switch is in position to make contact due to the actuation of the winding release mechanism.

FIG. 3 is a partial representation of the shutter of FIG. 1 in an intermediate position corresponding to the open position of the shutter blades and with the shutter trigger already released but with the switch still closed; and FIG. 4 is another partial representation of a different embodiment of the shutter having a one-armed positioning lever cooperating with the switch.

Figure 1:
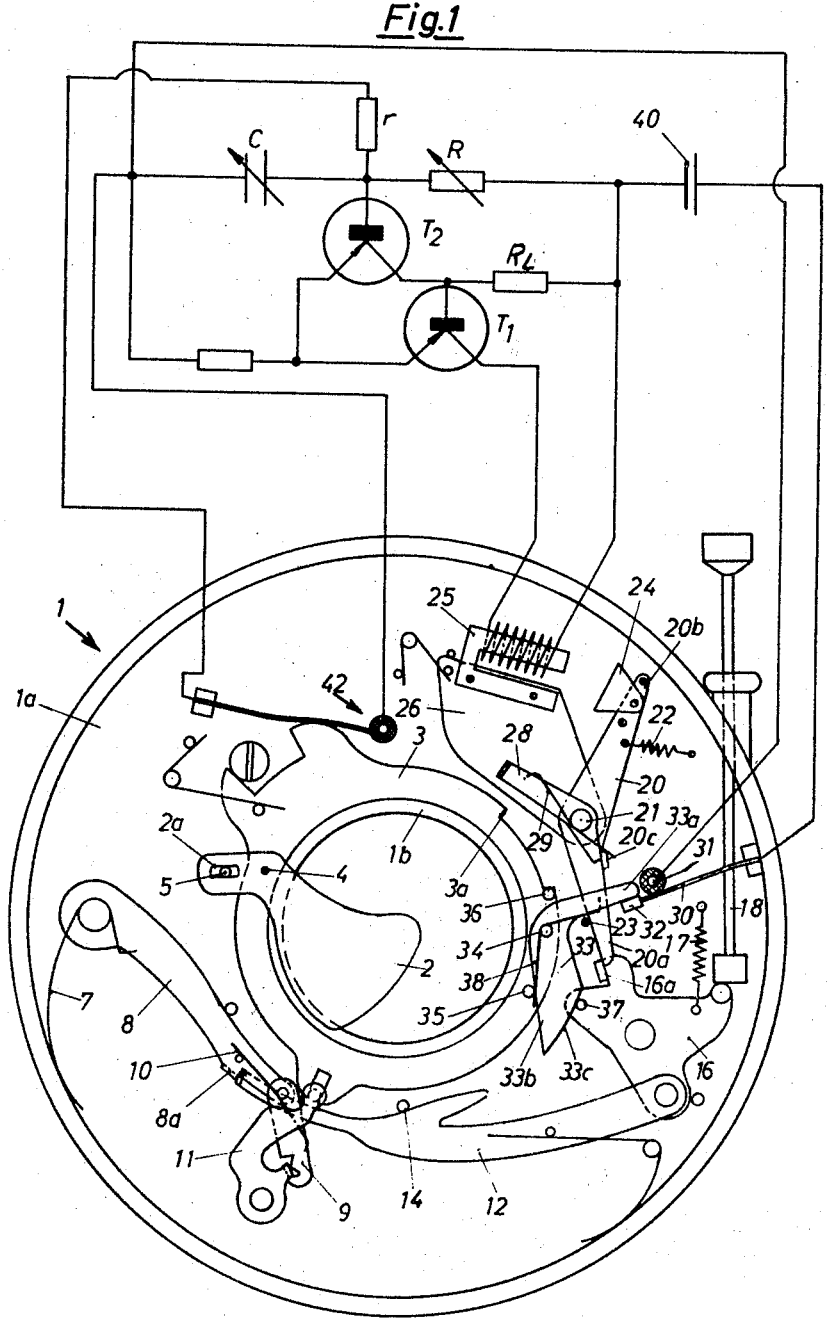
FIG. 1 shows a front view of the mechanism of a self-cocking shutter with its cover plate removed and in starting position and a schematic circuit diagram of an electronic timing circuit, the positioning lever of the shutter having the form of a two-armed structure in accordance with one embodiment of the invention.

In the drawings the housing 1 of a self-cocking shutter is shown with a housing bottom 1a and a concentric lens tube 1b. A ring 3 is mounted on the tube 1b to drive several shutter blades of which only one shutter blade 2 is shown. Each shutter blade 2 is mounted on a pin 4 of the ring 3, which is also referred to as the driving member and is guided by means of a pin-slot connection including a pin 5 and a slot 2a.

The ring 3 can be rotated back and forth by a mechanical driving device in order to move the shutter blades 2 between their closed position and their open position. This driving device has a stationary drive lever 8 biased by the spring 7. The free end of the lever 8 is linked to a push pawl 9 which is subjected to the force of a comparatively weak spring 10 so that the jaws of the pawl cooperate with an intermediate lever 11 which, in turn, engages the driving ring 3.

To move the drive lever 8 into its cocked position a spring-loaded thrust pawl 12 is utilized. The latter pawl is supported by a stationary pin 14 and has one end linked to a winding and release member 16 which serves as a reversing lever. The free end of the pawl 12 engages a tab 8a on the drive lever 8 during the winding process. The reversing lever 16 is subjected to the pressure of a spring 17 that holds it in contact with a shutter release plunger 18 that serves as the shutter trigger.

To enable the photographer to take pictures at different shutter speeds, or with exposures of different duration with the foregoing shutter arrangement, means are provided to arrest the shutter blade drive ring 3 and to control the duration of time that it is arrested by means of an electronic circuit so as to block the driving device and prevent its continuing to move away from the open position of the shutter blades. For this purpose a two-armed armature lever 20 is provided and is pivotally mounted on a stationary pin 21. A spring 22 presses upon the lever 20 to urge it into contact with a stop 23. One arm 20a of the lever 20 cooperates with a tab 16a of the reversing lever 16 while the other arm 20b carries an armature 24 into contact with an electromagnet 25 during the winding and releasing process. This electromagnet can be attached to a resilient carrying plate 26 which may be arranged co-axially with the armature lever 20.

Locking lever 28 is also mounted on the pin 21 and is pressed against a driving tab 20c on the lever 20 by means of a spring 29. The shutter blade drive ring 3 has an edge 3a with which the end of the locking lever 28 can engage when the shutter blades 2 have been moved to their open position, thereby blocking the shutter drive and holding the shutter blades open for the duration of the exposure time for which the timing circuit has been set.

Current to energize the electromagnet 25 is controlled by way of a switch comprising a movable member, or tongue 30 and a relatively fixed pin 31. The free end of the movable member 30 has an insulator 32 attached to it to make contact with one arm 33a of a positioning lever 33. In the embodiment shown in FIGS. 1–3, the lever 33 also has a second arm 33b which has a cam, or supporting, edge 33c in the shape of a partial circle. The lever 33 is mounted on a pin 34 which, in turn, is attached to the drive ring 3 to move therewith.

The lever 33 could also be mounted on a movable arm of another lever pivotally mounted on a stationary pin and made to interact with the driving ring 3 in such a way that the positioning lever would change its position as the ring rotates in order to operate the shutter blades. Two pins 35 and 36 are also attached to the drive ring 3 to limit the range of motion of the position lever 33. In a starting position of the shutter, as shown in FIG. 1, a driving pin 37 mounted on the reversing lever 16 bears against the positioning lever 33 to force the latter into contact with the pin 35 against the pressure of a spring 38. The other arm 33a of the lever bears against the insulator 32 and keeps the movable arm 30 of the switch out of contact with the pin 31. The cam edge 33c of the positioning lever is approximately concentric with the center of the shutter in this position.

The electronic timing circuit that controls the electromagnet 25 has a preferred condition of conductivity, i.e., is monostable. The main time-determining elements are a variable resistor R and a capacitor C. The electromagnet 25 and the emitter-collector output circuit of a transistor T1 are in series with the switch 30, 31 and a power source 40. The timing elements, resistor R and capacitator C, are also connected to the power source 40 by the switch 30, 31 to form a second series circuit.

The operating mode of the shutter arrangement described above is as follows:

When the shutter release plunger 18 is pressed down from its position at rest shown in FIG. 1, the reversing lever 16 turns clockwise, causing the armature lever 20 to rotate counterclockwise and to push the thrust pawl 12 to the left. During this process the driving pin 37 moves away from the arm 33b of the positioning lever 33, permitting the latter to rotate slightly under the effect of the spring 38 until it strikes the limiting pin 36. This permits the movable member 30 of the switch to make contact with the fixed pin 31, thereby supplying voltage to the timing circuit and energizing the electromagnet 25. During the further course of the release motion, the armature 24, as may be seen from FIG. 2, comes to rest against the magnet, which holds the armature 24 until the end of the time determined by the electronic timing circuit. In addition to bringing the armature 24 to the electromagnet 25, rotation of the lever 20 moves the blocking lever 28 into contact with the drive ring 3.

Movement of the thrust pawl 12 to the left moves the drive lever 8 into its cocked position, but the push pawl 9 still leaves the intermediate lever 11 in its rest position so that the shutter remains closed.

Near the end of the release motion, as shown in FIG. 2, the armature lever 20 leaves the tab 16a, and immediately thereafter the thrust pawl 12 disengages from the tab 8a of the drive lever 8. This frees the drive lever 8 to move counterclockwise under the force of the driving spring 7 to impart a rotary motion to the drive ring 3 by means of the push pawl 9 and the intermediate lever 11 to move the shutter blades 2 into their open position. When the drive ring 3 starts to move, the switch 42 opens and initiates the timing operation of the transistorized timing circuit.

As shown in FIG. 3, when the shutter blades 2 are in their open position, the blocking lever 28 engages the edge 3a of the drive ring 3 and thus arrests the operation of the drive ring with the shutter blades open. As shown in FIG. 1, the switch 42 is connected in series with a resistor $r$ across the capacitor C, the resistance of the resistor $r$ being preferably relatively low so as to discharge the capacitor C quickly and to keep it from charging up as long as the switch 42 is closed. Opening switch 42 permits the capacitor C to start charging from the voltage source 40 through the resistor R. When the capacitor C has charged to a certain voltage level, which it will do in a time determined by the capacitance of the capacitor C and the resistance of the resistor R, the transistor T2 will become conductive and its emitter-collector circuit will draw sufficient current through the load resistor $R_L$ to bias the base of the transistor $T_1$ to the non-conductive state, thereby halting the flow of the current through the emitter-collector output circuit of the transistor $T_1$ and through the coil of the electromagnet 25. As the magnetic field of the electromagnet 25 dies away, the force of the spring 22 pulls the lever 20 and the armature 24 away from the electromagnet to the starting position shown in FIG. 1. The pressure of the tab 20c on the lever 28 disengages the latter from the edge 3a of the drive ring and permits the latter to rotate clockwise back to the position in which the shutter blades are closed, as shown in FIG. 1.

When the drive ring 3 returns to its starting position, the mounting pin 34 of the position lever 33 moves clockwise away from the position shown in FIG. 3. As a result the positioning lever 33 remains in contact with with the limiting pin 36 under the force of the spring 38 if the shutter trigger 18 is still in the release position, which it will normally be in the case of short exposures. Therefore the movement of the mounting pin 34 back to the starting position does not cause the switch 30, 31 to open. This occurs only after the mounting pin 34 has returned to its starting position and in addition the shutter trigger 18 has also been released, permitting the reversing lever 16 to rotate counterclockwise under the force of the spring 17 and forcing the pin 37 against the edge 33c on the positioning lever 33 to press the latter against the other limiting pin 35.

If the shutter trigger 18 is permitted to return to its original position while the shutter is opened, as might happen particularly during a comparatively long exposure, the positioning lever 33 will make contact with the limiting pin 35 as shown in FIG. 3 but it will not cause the separation of the movable arm 30 from the fixed pin 31 of the main switch. Instead, the main switch will be opened only when the drive ring 3 returns to its starting position, i.e. it will be opened upon the return motion of both the positioning lever 33 and the drive ring 3.

If the shutter trigger 18 is not depressed correctly to cause an exposure, the thrust pawl 12 may not disengage from the tabe 8a. The drive ring 3 will remain in its starting position since neither the mechanical shutter drive device or the electronic timing circuit will have been actuated. When the reversing lever 16 returns to its starting position after this insufficient movement, the pin 37 will strike against the arm 33b and will turn the positioning lever 33 clockwise. This will cause the arm 33a to make contact with the movable member 30 of the switch, automatically removing it from contact with the fixed pin 31 and interrupting the flow of current to the electromagnet 25.

In the embodiment shown in FIG. 4 the positioning lever 33' has only one arm, but the basic operation remains the same. The lever 33' should be mounted rotatably on a mounting shaft 34' on the drive ring 3 along with two pins 35' and 36' that limit the movement of the lever 33'. A spring 38' is presssed between the pin 36' and the positioning lever 33' to exert a counter clockwise force on the latter. As a result, when the shutter trigger 18 is depressed, the positioning lever 33' follows the motion of the pin 37 and causes the switch consisting of a movable member 30' and a contact pin 31' to close. An insulating member 32' is attached to the end of the movable member 30' so that the lever 33' will strike this insulator rather than the movable 30'. The remainder of the function of the positioning lever 33' is identical to that of the positioning lever 33 of the embodiment shown in FIGS. 1-3.

While the invention has been described in detail, it will be understood that the description only shows one example thereof and that variations and modifications may be made without departing from the spirit of the invention as defined in the appended claims.

What is claimed is:

1. A photographic shutter comprising a blade (2) movable from a closed position to an open position to a closed position; locking means (28) to lock said blade in its open position; an electromagnet (25) connected to said means to actuate the same; a timing circuit connected to said electromagnet to control the operation thereof; a first switch (30, 31) connected to said timing circuit to control the operation thereof, said switch comprising a movable member (30); a shutter trigger (18), positioning means (33) moving with said shutter blade to engage said movable member and to permit said switch to close in order to energize said timing circuit and said electromagnet only when said shutter trigger is actuated; means (16, 12, 8, 9, 11, 3) connecting said shutter trigger; and means (35) to engage said positioning means when said locking means has locked said blade in its open position to prevent said positioning means from opening said switch until said timing circuit has caused said electromagnet to release said locking means.

2. The photographic shutter of claim 1 in which said means connecting said shutter trigger to said shutter blade comprises a drive member and said locking means engages said drive member to lock said blade in its open position.

3. The photographic shutter of claim 2 in which said positioning means comprises a lever mounted on said drive member to move therewith and said means to engage said positioning means comprises a first stop mounted on said driving member.

4. The photographic shutter of claim 2 in which said driving member is in the form of a ring having a substantially radially outwardly extending edge forming a substantially radial abutment and said locking means comprises a lever having a free end that engages said edge to lock said blade in its open position.

5. The photographic shutter of claim 4 in which said positioning means comprises a lever pivotally mounted on said ring and having a cam edge substantially concentric with said ring.

6. The photographic shutter of claim 3 in which said positioning means comprises a two-armed lever, one of said arms engaging said means connecting said shutter trigger to said shutter blade, and the other of said arms engaging said movable member.

7. The photographic shutter of claim 3 in which said positioning means comprises a one-armed pawl lever having a free end which engages said movable member; and said means connecting said shutter trigger to said shutter blade comprises a reversing lever engaging said pawl when said shutter trigger is not actuated.

8. The photographic shutter of claim 1 comprising, in addition, a pivotally mounted armature lever having a magnetic armature to engage said electromagnet, said locking means engaging said armature lever; and a spring biasing said armature lever away from said electromagnet whereby said locking means is prevented from locking said blade.

9. The photographic shutter of claim 8 in which said armature lever has two arms and said armature is mounted on one of said arms, and said means connecting said shutter trigger to said shutter blade comprises a reversing lever engaging the other of said arms of said armature lever said shutter also comprising a driving ring attached to said shutter blade, said positioning means comprising a lever pivotally mounted on said driving means and having a cam edge substantially concentric with said ring, said reversing lever having means engaging said edge of said positioning means when said shutter trigger is not actuated to press said positioning lever in a direction to open said switch, said means to engage said positioning means comprising a stop mounted on said driving ring to prevent said positioning means from being pivoted to open said switch when said locking means has locked said blade in its open position; and a spring engaging said positioning means to pivot said positioning means away from said stop.

10. The photographic shutter of claim 9 in which said reversing lever comprises means engaging the other arm of said armature lever to pivot said armature into contact with said electromagnet when said shutter trigger is actuated, said locking means comprising a lever pivotally concentrically mounted with respect to said armature lever and a second spring compressed between said locking means and said armature lever to urge said locking means into engagement with said driving ring to lock said blade in its open position.

11. The photographic shutter of claim 1 comprising, in addition, a second switch actuated by said means connecting said shutter trigger to said shutter blade to initiate the operation of said timing circuit when said shutter blade moves to its open position.

References Cited

UNITED STATES PATENTS 3,356,004  12/1967  Kiper _____ 95—63

JOHN M. HORAN, *Primary Examiner.*